United States Patent
Kuppulal et al.

(10) Patent No.: US 12,316,807 B2
(45) Date of Patent: May 27, 2025

(54) TECHNOLOGIES FOR AGENT INTERACTION ANALYSIS USING ARTIFICIAL INTELLIGENCE

(71) Applicant: Genesys Cloud Services, Inc., Menlo Park, CA (US)

(72) Inventors: Roopchand Kuppulal, Chennai (IN); Manivannan Periasamy, Chennai (IN); Vignesh Seramannar, Chennai (IN); Nivedha D, Chennai (IN); Venkat Raman Sankar, Chennai (IN); Pon Karthika Rajapandian, Chennai (IN); Monisha Padmavathi Ragavan, Chennai (IN); Mohamed Uvaiz Anwar Batcha, Chennai (IN); Ayyanar Veerapandian, Chennai (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 116 days.

(21) Appl. No.: 18/459,390

(22) Filed: Aug. 31, 2023

(65) Prior Publication Data
US 2025/0080654 A1    Mar. 6, 2025

(51) Int. Cl.
*H04M 3/00* (2024.01)
*H04M 3/51* (2006.01)

(52) U.S. Cl.
CPC ....... *H04M 3/5175* (2013.01); *H04M 3/5133* (2013.01)

(58) Field of Classification Search
CPC ................... H04M 3/5175; H04M 3/5133
See application file for complete search history.

(56) References Cited

U.S. PATENT DOCUMENTS

| 8,589,215 B2 | 11/2013 | Wright et al. |
| 9,485,359 B2 | 11/2016 | Kumar et al. |

(Continued)

FOREIGN PATENT DOCUMENTS

WO    2003013113 A2    2/2003

OTHER PUBLICATIONS

Genesys Skills Management, https://docs.genesys.com/Documentation/GSA#:~:text=What%20is%20Genesys%20Skills%20Management%3F%20Genesys%20Skills%20Management,installer%20that%20quickly%20and%20easily%20installs%20both%20products., 6 pages.

(Continued)

*Primary Examiner* — Rasha S Al Aubaidi
(74) *Attorney, Agent, or Firm* — Taft Stettinius & Hollister LLP

(57) ABSTRACT

A method for agent interaction analysis using artificial intelligence according to an embodiment includes receiving a transcript for a real-time agent interaction between a contact center agent and client, processing the interaction using at least one artificial intelligence model to determine a call adherence score, an agent positivity score, a client sentiment, an agent sentiment, and a plurality of agent skill levels associated with respective agent skills, determining a combined agent performance score based on the call adherence score and the agent positivity score, transmitting the combined agent performance score to an agent device for display on a gamification dashboard, retrieving agent-specific content of the contact center agent in response to determining that the agent sentiment is negative, and transmitting the agent-specific content to the agent device for display in conjunction with the real-time agent interaction to improve the agent sentiment.

20 Claims, 9 Drawing Sheets

(56) References Cited

U.S. PATENT DOCUMENTS

| | | |
|---|---|---|
| 10,567,580 B1 | 2/2020 | Montenegro et al. |
| 2008/0109797 A1* | 5/2008 | Khetarpal ............. G06Q 30/02 717/168 |
| 2010/0332287 A1 | 12/2010 | Gates et al. |
| 2021/0110329 A1 | 4/2021 | Delo |
| 2024/0430362 A1* | 12/2024 | Kelleher ............. H04M 3/5175 |

OTHER PUBLICATIONS

Performance DNA, https://docs.genesys.com/Documentation/PDNA, 3 pages.

Agents Performance views overview—Genesys Cloud Resource Center, https://help.mypurecloud.com/articles/new-agents-performance-views/, 3 pages.

Agent Groups, https://docs.genesys.com/Documentation/GA/latest/user/CfgAgentGroup, 6 pages.

* cited by examiner

TECHNOLOGIES FOR AGENT INTERACTION ANALYSIS USING ARTIFICIAL INTELLIGENCE

BACKGROUND

Contact centers typically rely on contact center agents to communicate with and respond to client inquiries and, therefore, contact centers routinely engage in agent training and evaluation in an effort to ensure that the contact center agents have learned and convey the appropriate information to contact center clients, and that they do so in a calm and professional manner. The current process for evaluating agent skills is a manual process in which agents are required to take performance assessments (e.g., multiple-choice quizzes, long-form essay questions, etc.) to measure their skills. However, such skill assessment is academic in nature and does not necessarily correlate with the agent's real-life performance.

SUMMARY

One embodiment is directed to a unique system, components, and methods for agent interaction analysis using artificial intelligence. Other embodiments are directed to apparatuses, systems, devices, hardware, methods, and combinations thereof for agent interaction analysis using artificial intelligence.

According to an embodiment, a method for agent interaction analysis using artificial intelligence may include receiving, by a computing system, a transcript for a real-time agent interaction between a contact center agent and a contact center client, processing, by the computing system, the real-time agent interaction using at least one artificial intelligence model to determine a call adherence score, an agent positivity score, a client sentiment of the contact center client, an agent sentiment of the contact center agent, and a plurality of agent skill levels associated with respective agent skills, determining, by the computing system, a combined agent performance score based on the call adherence score and the agent positivity score, transmitting, by the computing system, the combined agent performance score to an agent device for display on a gamification dashboard of the contact center agent, retrieving, by the computing system, agent-specific content of the contact center agent in response to determining that the agent sentiment of the contact center agent is negative, and transmitting, by the computing system, the agent-specific content to the agent device for display in conjunction with the real-time agent interaction to improve the agent sentiment of the contact center agent.

In some embodiments, retrieving the agent-specific content may include retrieving an agent-specific image associated with a positive experience of the contact center agent, and transmitting the agent-specific content to the agent device may include transmitting the agent-specific image to the agent device for display in conjunction with the real-time agent interaction.

In some embodiments, retrieving the agent-specific content may include retrieving previous positive client feedback received by the contact center agent, and transmitting the agent-specific content to the agent device may include transmitting the previous positive client feedback to the agent device for display in conjunction with the real-time agent interaction.

In some embodiments, retrieving the agent-specific content may include retrieving an excerpt from a positive historical interaction with the contact center agent, and transmitting the agent-specific content to the agent device may include transmitting the excerpt from the positive historical interaction to the agent device for display in conjunction with the real-time agent interaction.

In some embodiments, the method may further include anonymizing the transcript for the real-time agent interaction to generate an anonymized transcript, and processing the real-time agent interaction may include processing the anonymized transcript.

In some embodiments, the method may further include transmitting, by the computing system, a notification to an agent supervisor device in response to determining that the client sentiment of the contact center client is negative.

In some embodiments, the plurality of agent skill levels may include at least one agent technical skill.

In some embodiments, the plurality of agent skill levels may include at least one agent soft skill.

In some embodiments, the method may further include evaluating, by the computing system, the respective agent skills based on the plurality of agent skill levels and a plurality of respective predefined thresholds.

In some embodiments, the method may further include training, by the computing system, the at least one artificial intelligence model based on a plurality of historical interactions between contact center agents and contact center clients.

According to another embodiment, a system for agent interaction analysis using artificial intelligence may include at least one processor and at least one memory comprising a plurality of instructions stored thereon that, in response to execution by the at least one processor, causes the system to receive a transcript for a real-time agent interaction between a contact center agent and a contact center client, process the real-time agent interaction using at least one artificial intelligence model to determine a call adherence score, an agent positivity score, a client sentiment of the contact center client, an agent sentiment of the contact center agent, and a plurality of agent skill levels associated with respective agent skills, determine a combined agent performance score based on the call adherence score and the agent positivity score, transmit the combined agent performance score to an agent device for display on a gamification dashboard of the contact center agent, retrieve agent-specific content of the contact center agent in response to a determination that the agent sentiment of the contact center agent is negative, and transmit the agent-specific content to the agent device for display in conjunction with the real-time agent interaction to improve the agent sentiment of the contact center agent.

In some embodiments, to retrieve the agent-specific content may include to retrieve an agent-specific image associated with a positive experience of the contact center agent, and to transmit the agent-specific content to the agent device may include to transmit the agent-specific image to the agent device for display in conjunction with the real-time agent interaction.

In some embodiments, to retrieve the agent-specific content may include to retrieve previous positive client feedback received by the contact center agent, and to transmit the agent-specific content to the agent device may include to transmit the previous positive client feedback to the agent device for display in conjunction with the real-time agent interaction.

In some embodiments, to retrieve the agent-specific content may include to retrieve an excerpt from a positive historical interaction with the contact center agent, and to transmit the agent-specific content to the agent device may include to transmit the excerpt from the positive historical interaction to the agent device for display in conjunction with the real-time agent interaction.

In some embodiments, the plurality of instructions may further cause the system to anonymize the transcript for the real-time agent interaction to generate an anonymized transcript, and to process the real-time agent interaction may include to process the anonymized transcript.

In some embodiments, the plurality of instructions may further cause the system to transmit a notification to an agent supervisor device in response to a determination that the client sentiment of the contact center client is negative.

In some embodiments, the plurality of agent skill levels may include at least one agent technical skill.

In some embodiments, the plurality of agent skill levels may include at least one agent soft skill.

In some embodiments, the plurality of instructions may further cause the system to evaluate the respective agent skills based on the plurality of agent skill levels and a plurality of respective predefined thresholds.

In some embodiments, the plurality of instructions may further cause the system to train the at least one artificial intelligence model based on a plurality of historical interactions between contact center agents and contact center clients.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
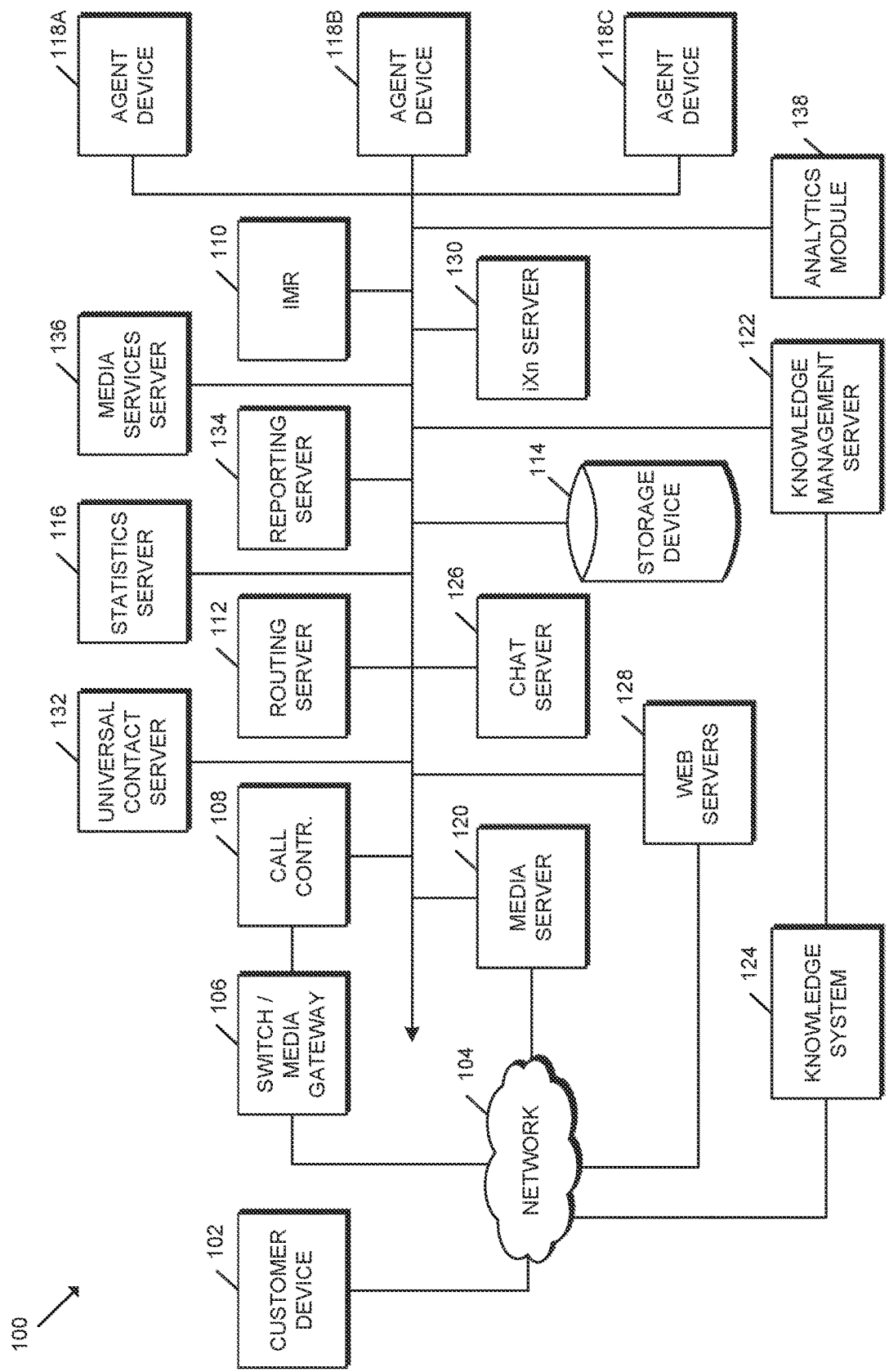
FIG. 1 depicts a simplified block diagram of at least one embodiment of a contact center system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, a simplified block diagram of at least one embodiment of a communications infrastructure and/or content center system, which may be used in conjunction with one or more of the embodiments described herein, is shown. The contact center system 100 may be embodied as any system capable of providing contact center services (e.g., call center services, chat center services, SMS center services, etc.) to an end user and otherwise performing the functions described herein. The illustrative contact center system 100 includes a customer device 102, a network 104, a switch/media gateway 106, a call controller 108, an interactive media response (IMR) server 110, a routing server 112, a storage device 114, a statistics server 116, agent devices 118A, 118B, 118C, a media server 120, a knowledge management server 122, a knowledge system 124, chat server 126, web servers 128, an interaction (iXn) server 130, a universal contact server 132, a reporting server 134, a media services server 136, and an analytics module 138. Although only one customer device 102, one network 104, one switch/media gateway 106, one call controller 108, one IMR server 110, one routing server 112, one storage device 114, one statistics server 116, one media server 120, one knowledge management server 122, one knowledge system 124, one chat server 126, one iXn server 130, one universal contact server 132, one reporting server 134, one media services server 136, and one analytics module 138 are shown in the illustrative embodiment of FIG. 1, the contact center system 100 may include multiple customer devices 102, networks 104, switch/media gateways 106, call controllers 108, IMR servers 110, routing servers 112, storage devices 114, statistics servers 116, media servers 120, knowledge management servers 122, knowledge systems 124, chat servers 126, iXn servers 130, universal contact servers 132, reporting servers 134, media services servers 136, and/or analytics modules 138 in other embodiments. Further, in some embodiments, one or more of the components described herein may be excluded from the system 100, one or more of the components described as being independent may form a portion of another component, and/or one or more of the component described as forming a portion of another component may be independent.

It should be understood that the term "contact center system" is used herein to refer to the system depicted in FIG. 1 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 100), the associated customer service provider (such as a particular customer service provider/agent providing customer services through the contact center system 100), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals," "customers," or "contact center clients"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 100 may be used by a customer service provider to provide various types of services to customers. For example, the contact center system 100 may be used to engage and manage interactions in which automated processes (or bots) or human agents communicate with customers. As should be understood, the contact center system 100 may be an in-house facility to a business or enterprise for performing the functions of sales and customer service relative to products and services available through the enterprise. In another embodiment, the contact center system 100 may be operated by a third-party service provider that contracts to provide services for another organization. Further, the contact center system 100 may be deployed on equipment dedicated to the enterprise or third-party service provider, and/or deployed in a remote computing environment such as, for example, a private or public cloud environment with infrastructure for supporting multiple contact centers for multiple enterprises. The contact center system 100 may include software applications or programs, which may be executed on premises or remotely or some combination thereof. It should further be appreciated that the various components of the contact center system 100 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 200, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture," a cloud execution model generally includes a service provider dynamically managing an allocation and provisioning of remote servers for achieving a desired functionality.

Figure 2:
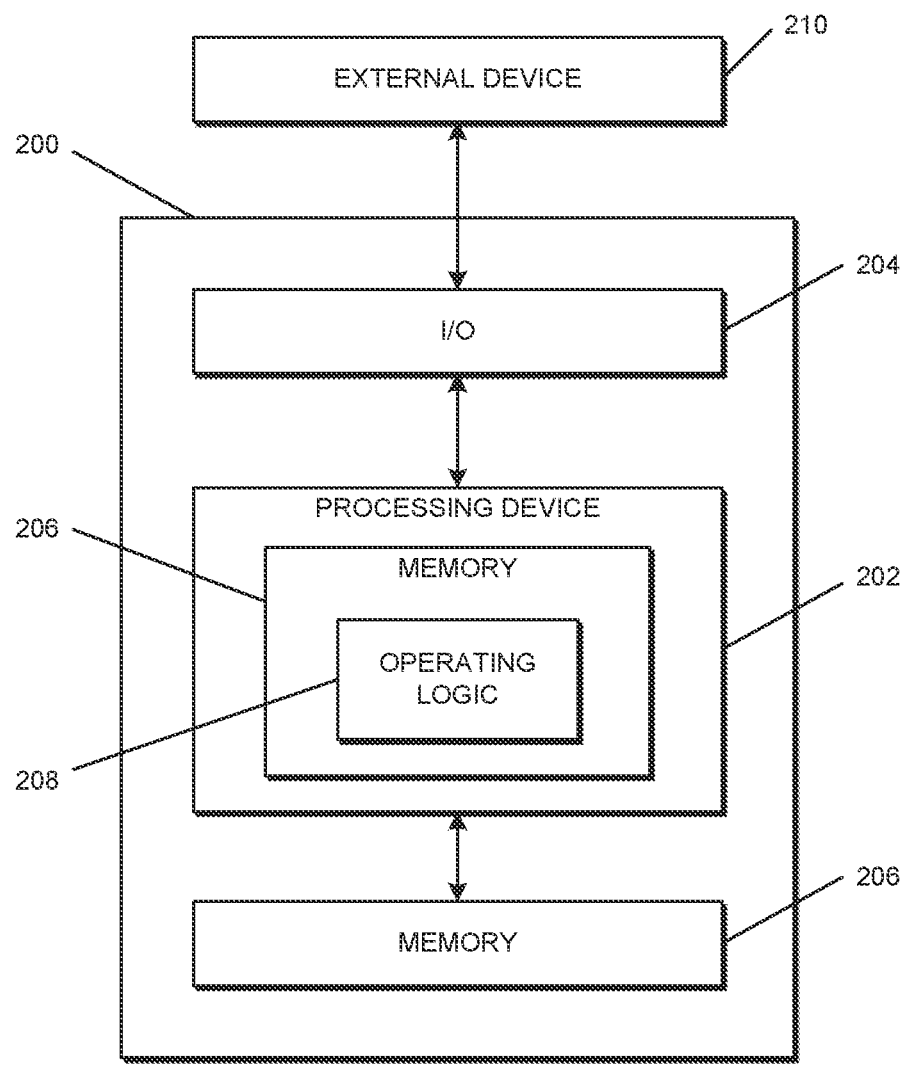
FIG. 2 is a simplified block diagram of at least one embodiment of a computing device.

It should be understood that any of the computer-implemented components, modules, or servers described in relation to FIG. 1 may be implemented via one or more types of computing devices, such as, for example, the computing device 200 of FIG. 2. As will be seen, the contact center system 100 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 100 may initiate inbound communications (e.g., telephone calls, emails, chats, etc.) to the contact center system 100 via a customer device 102. While FIG. 1 shows one such customer device—i.e., customer device 102—it should be understood that any number of customer devices 102 may be present. The customer devices 102, for example, may be a communication device, such as a telephone, smart phone, computer, tablet, or laptop. In accordance with functionality described herein, customers may generally use the customer devices 102 to initiate, manage, and conduct communications with the contact center system 100, such as telephone calls, emails, chats, text messages, web-browsing sessions, and other multi-media transactions.

Inbound and outbound communications from and to the customer devices 102 may traverse the network 104, with the nature of the network typically depending on the type of customer device being used and the form of communication. As an example, the network 104 may include a communication network of telephone, cellular, and/or data services. The network 104 may be a private or public switched telephone network (PSTN), local area network (LAN), private wide area network (WAN), and/or public WAN such as the Internet. Further, the network 104 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 106 may be coupled to the network 104 for receiving and transmitting telephone calls between customers and the contact center system 100. The switch/media gateway 106 may include a telephone or communication switch configured to function as a central switch for agent level routing within the center. The switch may be a hardware switching system or implemented via software. For example, the switch 106 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 118. Thus, in general, the switch/media gateway 106 establishes a voice connection between the customer and the agent by establishing a connection between the customer device 102 and agent device 118.

As further shown, the switch/media gateway 106 may be coupled to the call controller 108 which, for example, serves as an adapter or interface between the switch and the other routing, monitoring, and communication-handling components of the contact center system 100. The call controller 108 may be configured to process PSTN calls, VOIP calls, and/or other types of calls. For example, the call controller 108 may include computer-telephone integration (CTI) software for interfacing with the switch/media gateway and other components. The call controller 108 may include a session initiation protocol (SIP) server for processing SIP calls. The call controller 108 may also extract data about an incoming interaction, such as the customer's telephone number, IP address, or email address, and then communicate these with other contact center components in processing the interaction.

The interactive media response (IMR) server 110 may be configured to enable self-help or virtual assistant functionality. Specifically, the IMR server 110 may be similar to an interactive voice response (IVR) server, except that the IMR server 110 is not restricted to voice and may also cover a variety of media channels. In an example illustrating voice, the IMR server 110 may be configured with an IMR script for querying customers on their needs. For example, a contact center for a bank may instruct customers via the IMR script to "press 1" if they wish to retrieve their account balance. Through continued interaction with the IMR server 110, customers may receive service without needing to speak with an agent. The IMR server 110 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment.

The routing server 112 may function to route incoming interactions. For example, once it is determined that an inbound communication should be handled by a human agent, functionality within the routing server 112 may select the most appropriate agent and route the communication thereto. This agent selection may be based on which available agent is best suited for handling the communication. More specifically, the selection of appropriate agent may be based on a routing strategy or algorithm that is implemented by the routing server 112. In doing this, the routing server 112 may query data that is relevant to the incoming interaction, for example, data relating to the particular customer, available agents, and the type of interaction, which, as described herein, may be stored in particular databases. Once the agent is selected, the routing server 112 may interact with the call controller 108 to route (i.e., connect) the incoming interaction to the corresponding agent device 118. As part of this connection, information about the customer may be provided to the selected agent via their agent device 118. This information is intended to enhance the service the agent is able to provide to the customer.

It should be appreciated that the contact center system 100 may include one or more mass storage devices-represented generally by the storage device 114—for storing data in one or more databases relevant to the functioning of the contact center. For example, the storage device 114 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 114 may store agent data in an agent database. Agent data maintained by the contact center system 100 may include, for example, agent availability and agent profiles, schedules, skills, handle time, and/or other relevant data. As another example, the storage device 114 may store interaction data in an interaction database. Interaction data may include, for example, data relating to numerous past interactions between customers and contact centers. More generally, it should be understood that, unless otherwise specified, the storage device 114 may be configured to include databases and/or store data related to any of the types of information described herein, with those databases and/or data being accessible to the other modules or servers of the contact center system 100 in ways that facilitate the functionality described herein. For example, the servers or modules of the contact center system 100 may query such databases to retrieve data stored therein or transmit data thereto for storage. The storage device 114, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 116 may be configured to record and aggregate data relating to the performance and operational aspects of the contact center system 100. Such information may be compiled by the statistics server 116 and made available to other servers and modules, such as the reporting server 134, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 118 of the contact center system 100 may be communication devices configured to interact with the various components and modules of the contact center system 100 in ways that facilitate functionality described herein. An agent device 118, for example, may include a telephone adapted for regular telephone calls or VOIP calls. An agent device 118 may further include a computing device configured to communicate with the servers of the contact center system 100, perform data processing associated with operations, and interface with customers via voice, chat, email, and other multimedia communication mechanisms according to functionality described herein. Although FIG. 1 shows three such agent devices 118—i.e., agent devices 118A, 118B and 118C—it should be understood that any number of agent devices 118 may be present in a particular embodiment.

The multimedia/social media server 120 may be configured to facilitate media interactions (other than voice) with the customer devices 102 and/or the servers 128. Such media interactions may be related, for example, to email, voice mail, chat, video, text-messaging, web, social media, co-browsing, etc. The multimedia/social media server 120 may take the form of any IP router conventional in the art with specialized hardware and software for receiving, processing, and forwarding multi-media events and communications.

The knowledge management server 122 may be configured to facilitate interactions between customers and the knowledge system 124. In general, the knowledge system 124 may be a computer system capable of receiving questions or queries and providing answers in response. The knowledge system 124 may be included as part of the contact center system 100 or operated remotely by a third party. The knowledge system 124 may include an artificially intelligent computer system capable of answering questions posed in natural language by retrieving information from information sources such as encyclopedias, dictionaries, newswire articles, literary works, or other documents submitted to the knowledge system 124 as reference materials. As an example, the knowledge system 124 may be embodied as IBM Watson or a similar system.

The chat server 126, it may be configured to conduct, orchestrate, and manage electronic chat communications with customers. In general, the chat server 126 is configured to implement and maintain chat conversations and generate chat transcripts. Such chat communications may be conducted by the chat server 126 in such a way that a customer communicates with automated chatbots, human agents, or both. In exemplary embodiments, the chat server 126 may perform as a chat orchestration server that dispatches chat conversations among the chatbots and available human agents. In such cases, the processing logic of the chat server 126 may be rules driven so to leverage an intelligent workload distribution among available chat resources. The chat server 126 further may implement, manage, and facilitate user interfaces (UIs) associated with the chat feature, including those UIs generated at either the customer device 102 or the agent device 118. The chat server 126 may be configured to transfer chats within a single chat session with a particular customer between automated and human sources such that, for example, a chat session transfers from a chatbot to a human agent or from a human agent to a chatbot. The chat server 126 may also be coupled to the knowledge management server 122 and the knowledge systems 124 for receiving suggestions and answers to queries posed by customers during a chat so that, for example, links to relevant articles can be provided.

The web servers 128 may be included to provide site hosts for a variety of social interaction sites to which customers subscribe, such as Facebook, Twitter, Instagram, etc. Though depicted as part of the contact center system 100, it should be understood that the web servers 128 may be provided by third parties and/or maintained remotely. The web servers 128 may also provide webpages for the enterprise or organization being supported by the contact center system 100. For example, customers may browse the webpages and receive information about the products and services of a particular enterprise. Within such enterprise webpages, mechanisms may be provided for initiating an interaction with the contact center system 100, for example, via web chat, voice, or email. An example of such a mechanism is a widget, which can be deployed on the webpages or websites hosted on the web servers 128. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 130 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 130 may be configured to interact with the routing server 112 for selecting an appropriate agent to handle each of the deferrable activities. Once assigned to a particular agent, the deferrable activity is pushed to that agent so that it appears on the agent device 118 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 118 may include a workbin. As an example, a workbin may be maintained in the buffer memory of the corresponding agent device 118.

The universal contact server (UCS) 132 may be configured to retrieve information stored in the customer database and/or transmit information thereto for storage therein. For example, the UCS 132 may be utilized as part of the chat feature to facilitate maintaining a history on how chats with a particular customer were handled, which then may be used as a reference for how future chats should be handled. More generally, the UCS 132 may be configured to facilitate maintaining a history of customer preferences, such as preferred media channels and best times to contact. To do this, the UCS 132 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 134 may be configured to generate reports from data compiled and aggregated by the statistics server 116 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 136 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), screen recording, speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 138 may be configured to provide systems and methods for performing analytics on data received from a plurality of different data sources as functionality described herein may require. In accordance with example embodiments, the analytics module 138 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 138 may have access to the data stored in the storage device 114, including the customer database and agent database. The analytics module 138 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 138 may be configured to retrieve data stored within the storage device 114 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 138 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 138 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 1 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact center system 100 may be affected through user interfaces (UIs) which may be generated on the customer devices 102 and/or the agent devices 118.

As noted above, in some embodiments, the contact center system 100 may operate as a hybrid system in which some or all components are hosted remotely, such as in a cloud-based or cloud computing environment. It should be appreciated that each of the devices of the contact center system 100 may be embodied as, include, or form a portion of one or more computing devices similar to the computing device 200 described below in reference to FIG. 2.

Referring now to FIG. 2, a simplified block diagram of at least one embodiment of a computing device 200 is shown. The illustrative computing device 200 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 200, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein-such as the contact center system 100 of FIG. 1—the various servers and computer devices thereof may be located on local computing devices 200 (e.g., on-site at the same physical location as the agents of the contact center), remote computing devices 200 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as one or more of the devices/systems described herein, and/or a portion thereof. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

The computing device 200 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 200 may communicate with other computing devices 200 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 200 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

It should be appreciated that the technologies for agent interaction analysis using artificial intelligence described herein may address various challenges within contact centers, for example, with respect to agent performance analysis and agent motivation. Further, the analysis of agent performance can be integrated with gamification and means of motivation in order to improve agent performance. In particular, in some embodiments, a computing system may leverage one or more AI models for real-time agent skill analysis, real-time agent performance analysis, and/or providing positive feedback to improve agent sentiment in real time during an agent interaction.

The computing system may automate the process of skill assessment in the contact center by analyzing real-life interactions between clients and agents, and the analysis may help to gain insight into what technical/soft skills require improvement among agents. The computing system may also analyze the agent-client interaction in real time to determine a call adherence score, agent positivity score, and client sentiment (or client satisfaction) and update the agent and/or supervisor dashboard in real time with those scores. The computing system may provide the agent's supervisor with an option to either join the call/interaction and coach the agent (e.g., overtly or anonymously) or join the interaction to increase the first call resolution rate. The computing system may also improve an agent's sentiment (e.g., in response to detecting negative sentiment or lack of positivity) by displaying happy moments, positive feedback, and/or past relevant resolutions on the agent's dashboard during the real-time interactions. For example, agents suffering from a lack of motivation may face challenging and stressful situations on a daily basis, which can lead to low motivation levels. By displaying positive feedback and success stories in the agent's dashboard during a difficult situation, agents can feel a sense of pride and accomplishment, which can motivate the agents to continue delivering high-quality service to customers. Similarly, agents who feel disconnected from their work or company culture may experience low engagement levels. By displaying some of an agent's happy moments in the dashboard, the agent can feel more connected to his colleagues and the company culture, which can improve the agent's overall engagement and job satisfaction. Further, in some embodiments, the computing system may display positive customer feedback and success stories in the agent's dashboard.

FIGS. 3-6 illustrate various methods that may serve to analyze and/or motivate agents. Although described herein as independent methods, it should be appreciated that, in various embodiments, one or more of the methods of FIGS. 3-6 may be performed in conjunction with one another. For example, in some embodiments, a computing system may process a real-time agent interaction between a contact center agent and a contact center client using at least one AI model to determine a call adherence score, an agent positivity score, a client sentiment of the contact center client, an agent sentiment of the contact center agent, and a plurality of agent skill levels associated with respective agent skills, and make various determinations, evaluations, feedback, and/or recommendations in view of those analyses.

Figure 3:
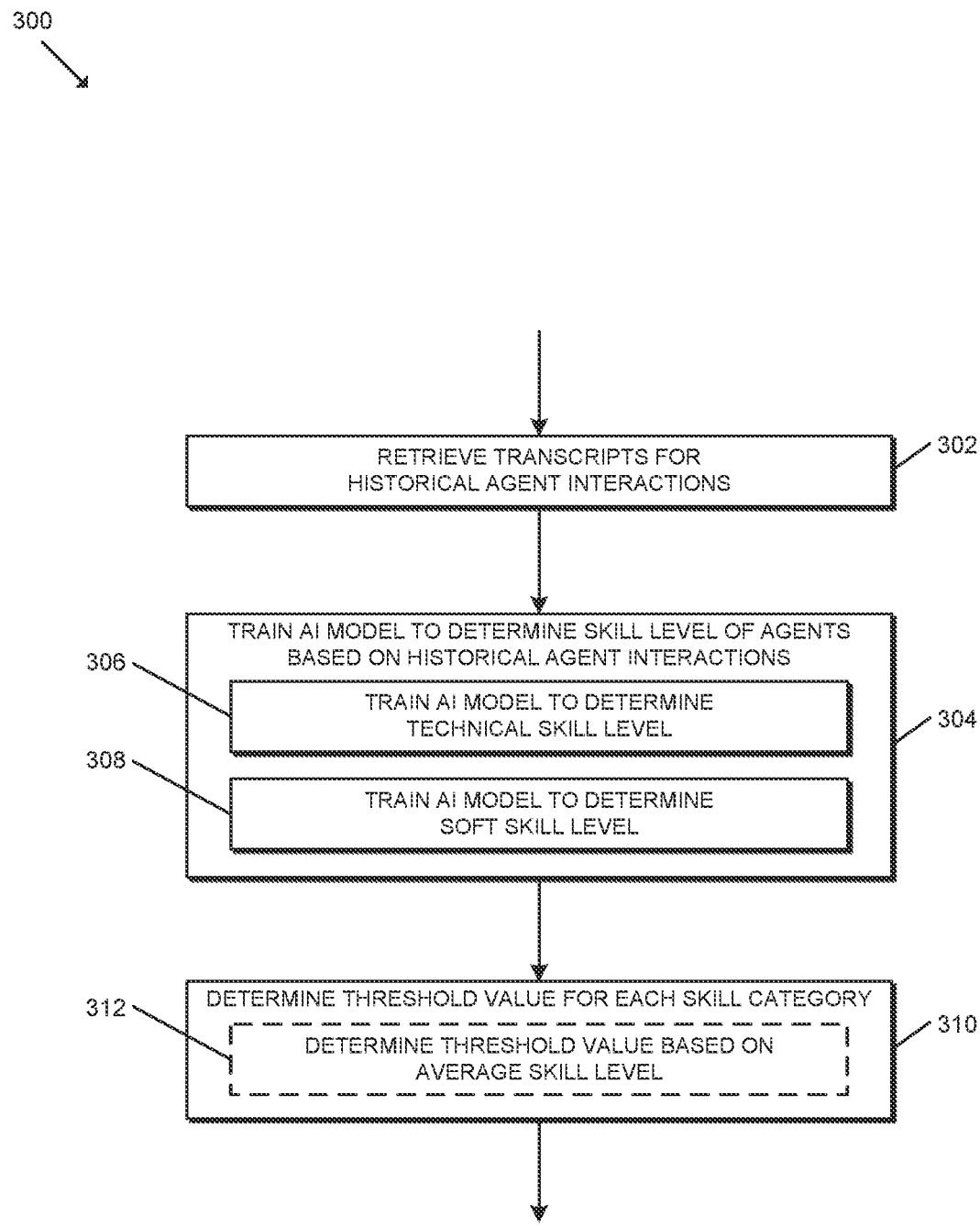
FIG. 3 is a simplified flow diagram of at least one embodiment of a method for training an artificial intelligence model for agent skill analysis.

Referring now to FIG. 3, in use, a computing system (e.g., the contact center system 100) may execute a method 300 for training an artificial intelligence model for agent skill analysis. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the computing system retrieves a plurality of transcripts associated with historical agent interactions between contact center agents and contact center clients. It should be appreciated that, in audio interactions, a transcript may be automatically generated in real time for the interaction. In block 304, the computing system trains an artificial intelligence (AI) model to determine the skill level of agents for a plurality of agent skills based on the historical agent interactions. It should be appreciated that the skill level for a particular skill may be indicative of and/or otherwise correlate with the agent's proficiency with that skill, and the skill level may be normalized and/or represented in any manner consistent with the technologies described herein. More specifically, in block 306, the computing system trains the AI model to determine an agent's technical skill levels (e.g., for each of a plurality of technical skills), and in block 308, the computing system trains the AI model to determine an agent's soft skill levels (e.g., for each of a plurality of soft skills). It should be appreciated that the technical skills may vary depending on the particular contact center, the contact center context, the technical domains handled by the contact center (e.g., the relevant business sectors/industries), and/or other characteristics. For example, in the banking industry, the technical skills may include handling interactions related to "transactions," "credit cards," "debit cards," "home loans," "gold loans," and/or other skills relevant to the banking industry. The soft skills may include skills common across all (or some) contact centers such as, for example, "positivity," "empathy," "time management," "listening," "fluency," "problem-solving," and/or other skills relevant to agent-client interactions. It should be appreciated that the number of technical skills and/or soft skills for which the AI model is trained may vary depending on the particular embodiment.

It should be appreciated that, in performing the various AI-related functions described herein, the computing system may utilize large language models (LLMs), neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning (ML) algorithms, models, techniques, and/or artificial intelligence technologies. Additionally, the number of AI/ML models used by the computing system may vary depending on the particular embodiment. For example, in some embodiments, a single AI/ML model may be used, whereas in other embodiments, multiple AI/ML models may be used.

In block 310, the computing system determines or establishes a respective threshold value for each agent skill (e.g., to be compared against the corresponding agent skill level). For example, in some embodiments, the computing system may determine the threshold value for a particular agent skill based on the average skill level of agents based on the analysis of the historical agent interactions.

Although the blocks 302-312 are described in a relatively serial manner, it should be appreciated that various blocks of the method 500 may be performed in parallel in some embodiments.

Figure 4:
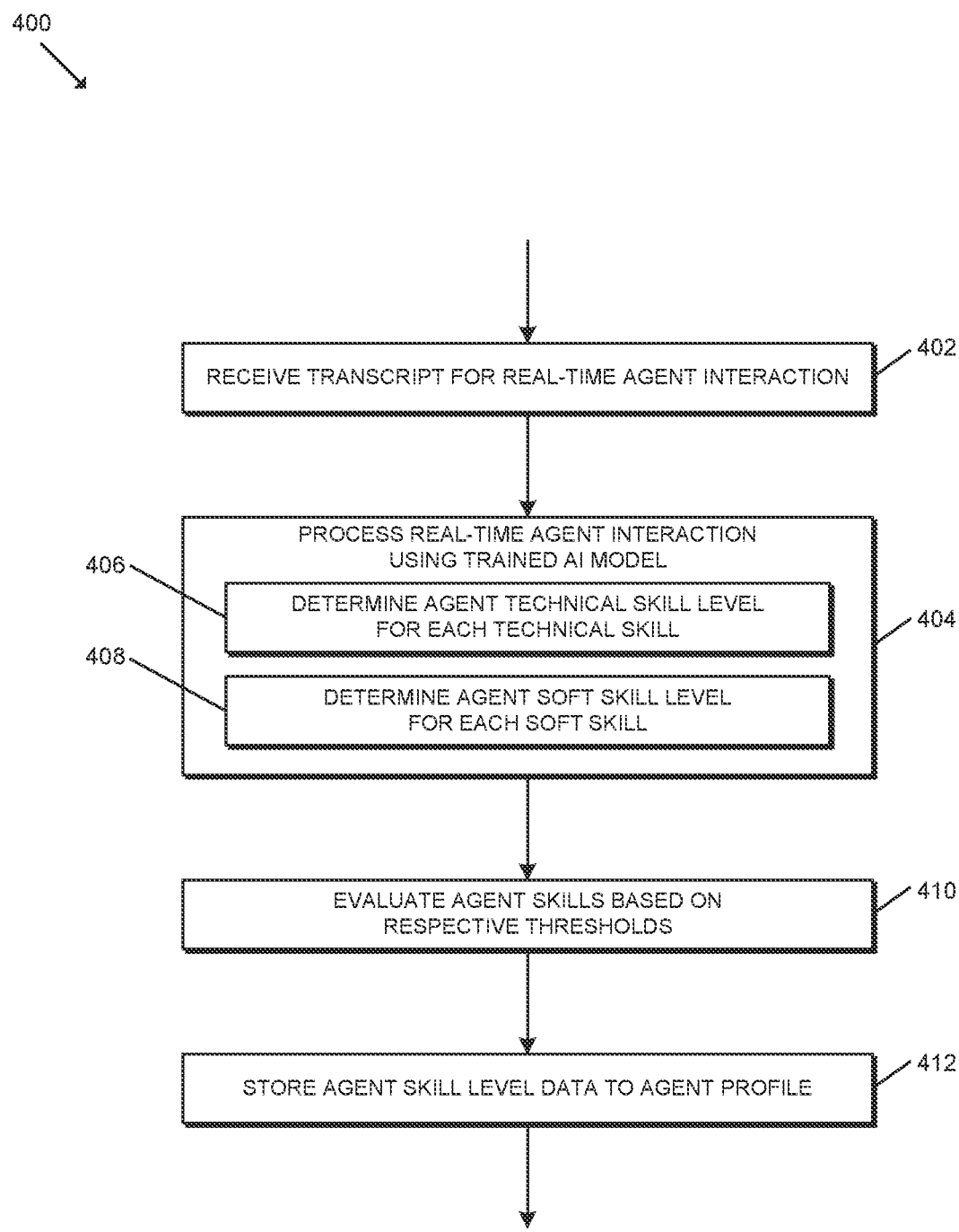
FIG. 4 is a simplified flow diagram of at least one embodiment of a method for real-time agent skill analysis.

Referring now to FIG. 4, in use, a computing system (e.g., the contact center system 100) may execute a method 400 for real-time agent skill analysis. It should be appreciated that the particular blocks of the method 400 are illustrated by way of example, and such blocks may be combined or divided, added or removed, and/or reordered in whole or in part depending on the particular embodiment, unless stated to the contrary.

The illustrative method 400 begins with block 402 in which the computing system receives a transcript for a real-time agent interaction between a contact center agent and a contact center client. In block 404, the computing system processes the real-time agent interaction using a trained AI model to determine the agent's skill level associated with various respective agent skills. In doing so, in block 406, the computing system may determine the agent's technical skill level for each technical skill being evaluated, and in block 408, the computing system may determine the agent's soft skill level for each soft skill being evaluated. In block 410, the computing system evaluates the agent skills based on respective predefined thresholds (e.g., to identify skill gaps for the agent). For example, the scores for a particular skill may be normalized, such as from 0 to 5, with the threshold set at a value within the range, such as 3. If an agent's skill level for that particular skill is less than the predefined threshold of 3, the computing system may determine that the agent needs to be trained to improve that particular skill (e.g., soft or technical skill). It should be appreciated that the predefined threshold may serve as an acceptable performance threshold for that particular skill. In block 412, the computing system stores agent skill level data to the agent's profile. For example, the computing system may store the raw skill-related data, the interaction data, the determined skill level for each respective agent skill, the results of the evaluations, and/or other agent skill level data depending on the particular embodiment. It should be appreciated that the contact center system may leverage the agent skill level data in the agent profile to determine and/or generate personalized learning paths for each agent to improve their skills.

Although the blocks 402-412 are described in a relatively serial manner, it should be appreciated that various blocks of the method 400 may be performed in parallel in some embodiments.

Figure 5:
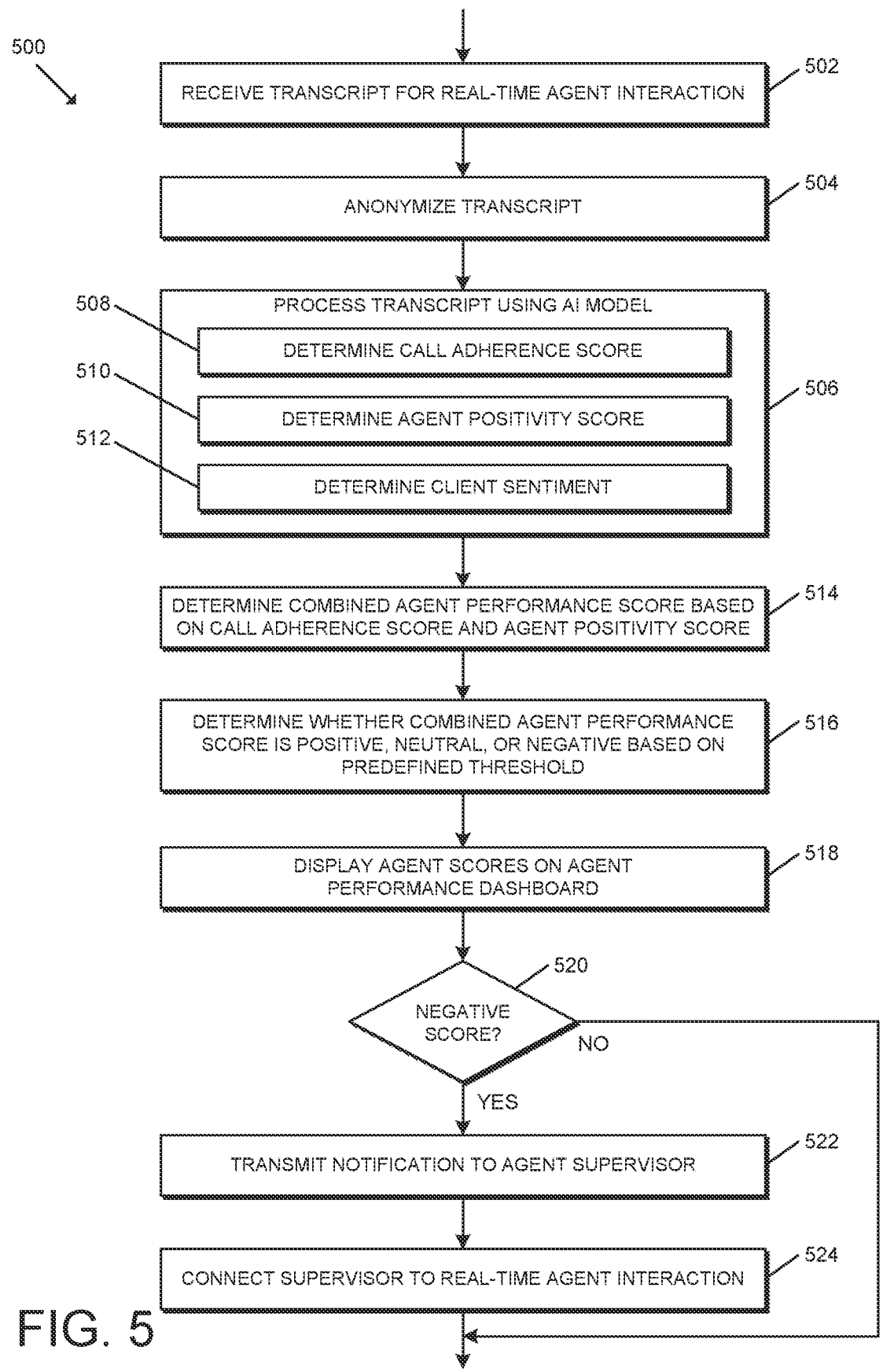
FIG. 5 is a simplified flow diagram of at least one embodiment of a method for real-time agent performance analysis.

Referring now to FIG. 5, in use, a computing system (e.g., the contact center system 100) may execute a method 500 for real-time agent performance analysis. It should be appreciated that the particular blocks of the method 500 are illustrated by way of example, and such blocks may be combined or divided, added or removed, and/or reordered in whole or in part depending on the particular embodiment, unless stated to the contrary.

The illustrative method 500 begins with block 502 in which the computing system receives a transcript for a real-time agent interaction between a contact center agent and a contact center client. In some embodiments, in block 504, the computing system may anonymize the transcript to remove identifying information for the agent and/or the client. In block 506, the computing system processes the transcript (or anonymized transcript) using an AI model to determine various characteristics associated with the agent's real-time performance during the interaction. In doing so, block 508, the computing system may determine a call adherence score for the real-time agent interaction. In block 510, the computing system may determine an agent positivity score for the real-time agent interaction. In block 512, the computing system may determine a client sentiment associated with the real-time agent interaction.

It should be appreciated that the call adherence score may be determined based on a set of predefined/preconfigured call adherence rules that the agent is supposed to follow during an interaction with a client. For example, the call adherence rules may require that the agent provide a personalized salutation during the start of the interaction, that the agent empathize with the client during the interaction, that the agent request permission to place the client on hold or transfer the interaction before doing so, and/or other requirements or expectations. It should be appreciated that, in some embodiments, the AI model may be trained and fine-tuned based on a set of labeled data, wherein the label indicates the level of adherence for the call/interaction, such that the AI model is able to evaluate other interactions to make a prediction of the adherence level. The agent positivity score may be indicative of a positivity tone of the agent. In some embodiments, the computing system may leverage natural language processing (NLP) and/or an AI model to generate a prediction/output indicative of the positivity of the agent during a particular interaction. The customer sentiment may be associated with the level of customer satisfaction and/or tone of the contact center client during the interaction. It should be appreciated that, by understanding the client's level of satisfaction, the agent may be able to pivot in real time if necessary to improve the client experience.

In block 514, the computing system determines a combined agent performance score based on the call adherence score and the agent positivity score. In block 516, the computing system determines whether the combined agent performance score is positive, neutral, or negative based on a predefined threshold. For example, in some embodiments, the combined agent performance score may be normalized, such as from 0 to 5, and there may be a predefined threshold associated with positive, neutral, and negative scores. For example, the threshold may be predefined to be 3, such that a combined agent performance score greater than 3 is a positive score, a combined agent performance score equal to 3 is a neutral score, and a combined agent performance score less than 3 is a negative score. It should be appreciated that the call adherence score and the agent positivity score may be combined using any suitable algorithm to generate the combined agent performance score depending on the particular embodiment. Similarly, the range of the combined agent performance score and the predefined threshold value may vary depending on the particular embodiment. In some embodiments, the combined agent performance score is an average (or weighted average) of the call adherence score and the agent positivity score. Although the combined agent performance score is described as being evaluated against a single threshold value, it should be appreciated that the call adherence score and/or the agent positivity score may, additionally or alternatively, be evaluated against respective predefined threshold values in other embodiments.

In block 518, the computing system may transmit the combined agent performance score, the call adherence score, the agent positivity score, a score or indicium of the client sentiment, and/or other agent performance data to an agent device for display on the agent's performance/gamification dashboard. It should be appreciated that the scores/indicia may be displayed on the agent's performance/gamification dashboard in any suitable format including, for example, numeric, graphical, and/or otherwise.

In block 520, the computing system determines whether one or more of the determines scores is negative. If so, in block 522, the computing system transmits a notification to an agent supervisor device to alert the agent's supervisor of the negative score in real-time (e.g., while the interaction between the agent and client is commencing). In some embodiments, the notification may appear on a supervisor dashboard on the agent supervisor device. In block 524, the computing system may connect the supervisor to the real time agent interaction. For example, in some embodiments, the agent's supervisor may determine to intervene in the interaction in order to coach the agent and/or to take over the handling of the interaction depending on the circumstances of the interaction. It should be appreciated that, in some embodiments, the computing system evaluates the client satisfaction, and transmits the notification to the supervisor if the client satisfaction is negative. In other embodiments, the computing system may, additionally or alternatively, notify the supervisor if another score is negative (e.g., the combined agent performance score). In yet another embodiment, the computing system may only notify the supervisor if multiple scores are negative.

Although the blocks 502-524 are described in a relatively serial manner, it should be appreciated that various blocks of the method 500 may be performed in parallel in some embodiments.

Figure 6:
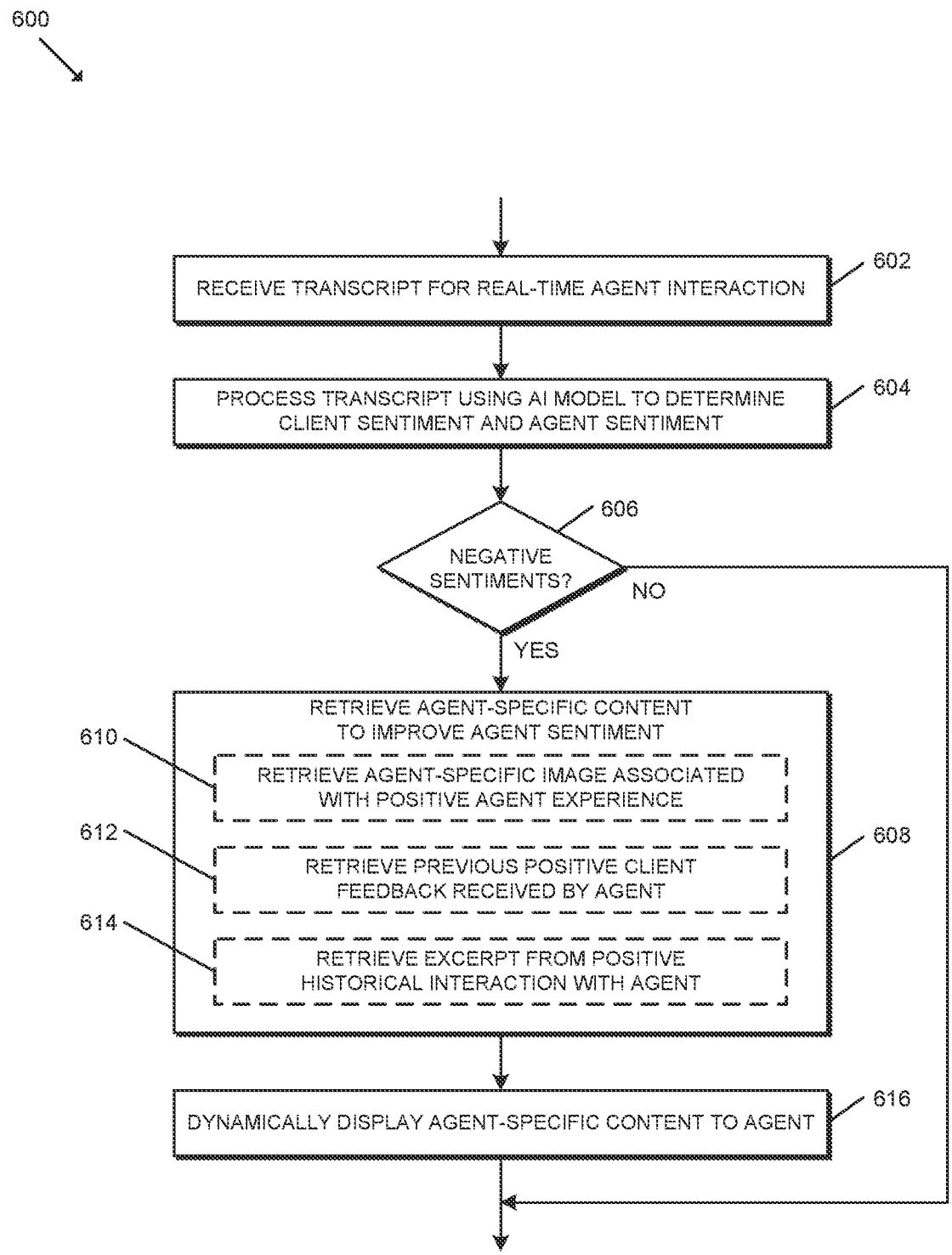
FIG. 6 is a simplified flow diagram of at least one embodiment of a method for positive feedback to improve agent sentiment.

Referring now to FIG. 6, in use, a computing system (e.g., the contact center system 100) may execute a method 600 for positive feedback to improve agent sentiment. It should be appreciated that the particular blocks of the method 600 are illustrated by way of example, and such blocks may be combined or divided, added or removed, and/or reordered in whole or in part depending on the particular embodiment, unless stated to the contrary.

It should be appreciated that the computing system may collect pictures and snapshots during trainings, meetings, video calls to clients, personal pictures uploaded by agents, and/or other media related to an agent's job or the agent in other contexts, and store those media in a data store in associated with that particular agent. Additionally, the computing system may also store various excerpts and/or snippets of interaction transcripts involving the agent that correlate with positive experiences (e.g., happy client feedback, successful issue resolution, etc.).

The illustrative method 600 begins with block 602 in which the computing system receives a transcript for a real-time agent interaction between a contact center agent and a contact center client. In block 604, the computing system processes the transcript using an AI model to determine the client sentiment of the contact center client and the agent sentiment of the contact center agent. In block 606, the computing system determines whether both the client sentiment and the agent sentiment are negative. If so, the method 600 advances to block 608 in which the computing system retrieves agent-specific content of the contact center agent intended to improve the agent sentiment (e.g., improve the attitude or mood of the agent). For example, in block 610, the computing system may retrieve an agent-specific image associated with a positive experience of the contact center agent (e.g., family photos of the agent, vacation photos, and/or other happy photos). In block 612, the computing system may retrieve previous positive client feedback received by the contact center agent. In block 614, the computing system may retrieve an excerpt from a positive historical interaction with the contact center agent. Further, it should be appreciated that the computing system may retrieve other agent-specific content designed to improve the mood of the agent in other embodiments. In block 616, the computing system transmits the agent-specific content to the agent device for display on the agent device in conjunction with the real-time agent interaction (e.g., on the agent's dashboard, in the live interaction/chat, in the background, and/or elsewhere) to improve the agent sentiment of the contact center agent.

For example, if a heated moment arises during an agent's interaction with the client, the computing system may match the intensity of the argument with a picture of a similar (but countervailing) level of intensity. The picture may then be displayed dynamically on the agent's screen, helping the agent to calm down and be motivated to engage more positively with the client for the remainder of the interaction. The computing system may also display data from positive customer feedback and past successfully resolved client interactions as a snippet/excerpt, such that agents can find a more personalized and meaningful source from which to draw positive motivation. It should be appreciated that such positive feedback features may improve the overall success of the contact center by reducing agent stress and improving client satisfaction and retention, thus promoting client loyalty.

Although the blocks 602-616 are described in a relatively serial manner, it should be appreciated that various blocks of the method 600 may be performed in parallel in some embodiments. Additionally, although the illustrative embodiment describes the positive feedback being employed only when both the agent and client sentiment are negative, it should be appreciated that the positive feedback may be used in other embodiments as well (e.g., if the agent sentiment is negative irrespective of the client sentiment, if the agent sentiment is negative and the client sentiment is neutral, if the agent sentiment is neutral, etc.).

Figure 7:
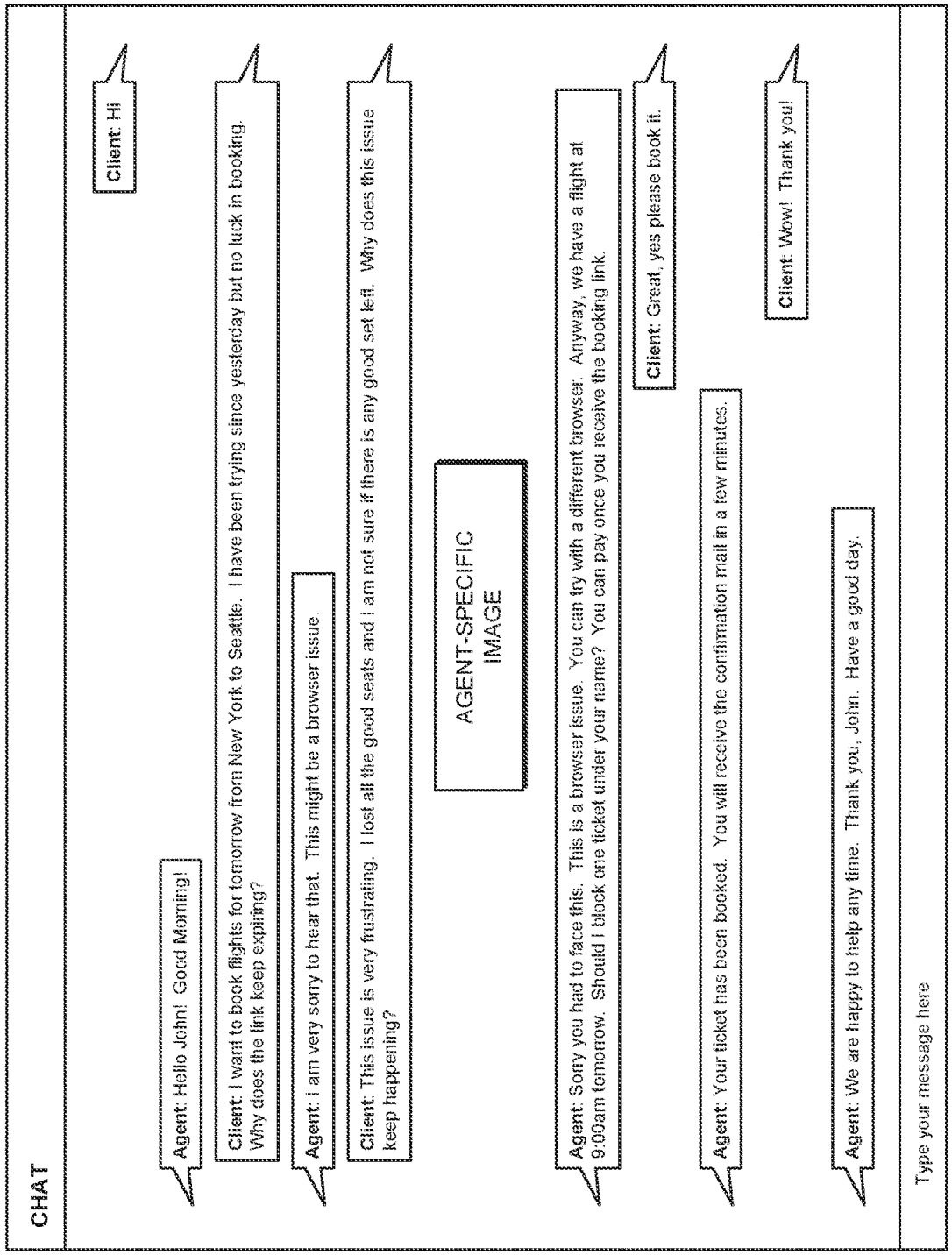
FIGS. 7-9 are examples of various agent-client interactions involving positive feedback to improve agent sentiment.
Figure 8:
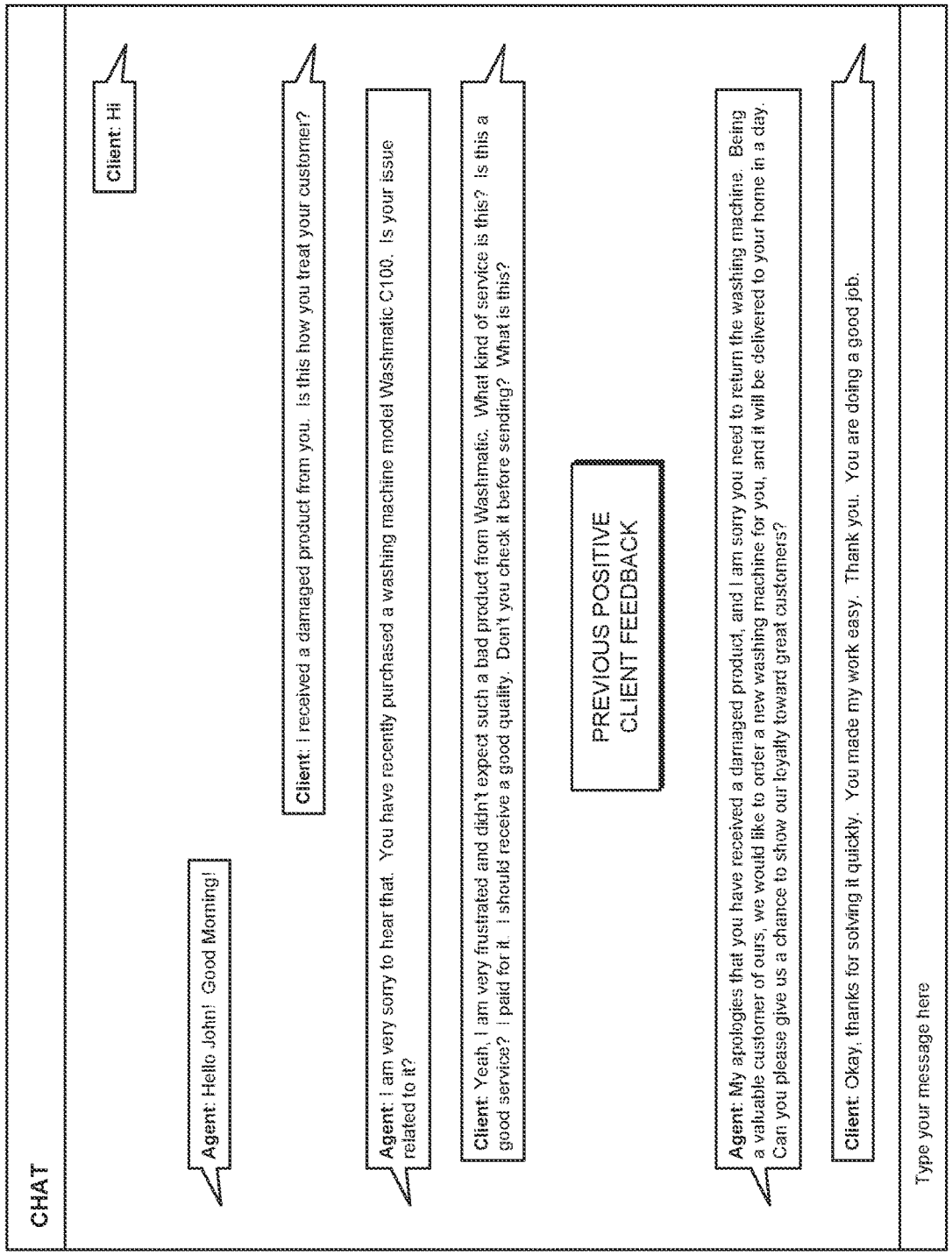
Figure 9:
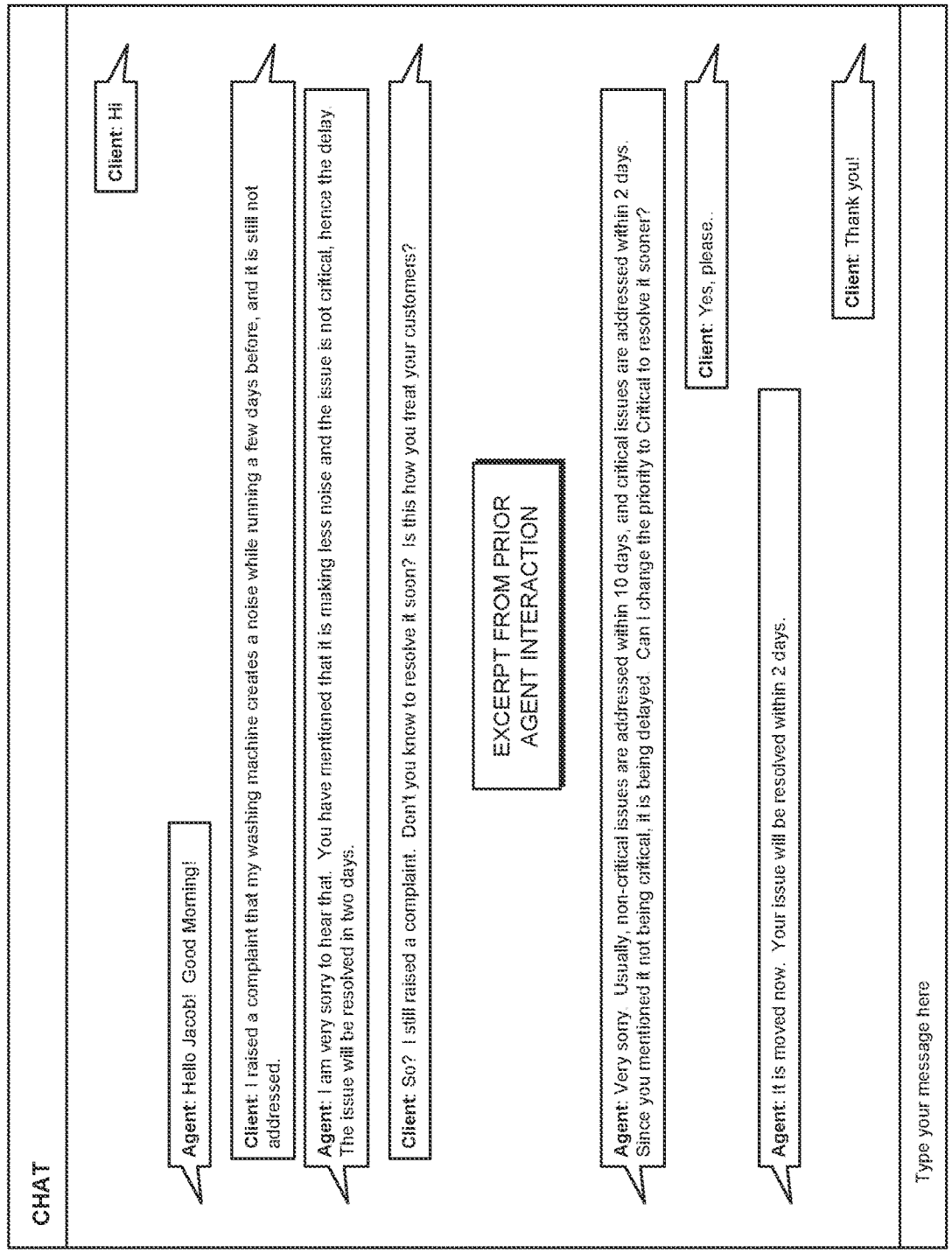

FIGS. 7-9 illustrate various example agent-client interactions that incorporate positive feedback to improve agent sentiment, such as in a manner similar to that described in reference to the method 600 of FIG. 6. For example, referring now to FIG. 7, suppose a client is communicating with contact center support through chat or video/voice and is trying to get his tickets booked for a flight. Every time the client attempts to book, however, he is facing an issue with the link expiring. The client is frustrated that he has missed book all of the good seats and speaks angrily with the agent. The computing system analyzes the real-time interaction and understands that the client is furious, and the agent is sad/upset, so the computing system immediately retrieves and displays a picture of the agent that matches the intensity of the argument (but with a countervailing positive emotion) to calm down the agent. By looking at the picture, the agent calms down and his mood is improved. The agent is then able to respond with empathy and quickly resolve the issue.

Referring now to FIG. 8, suppose a client is purchasing a washing machine. The client has received a damaged product and is in communication with contact center support to address the issue. The client is furious because of the damaged product and gives negative comments. The computing system analyzes the interaction between the agent and client, and understands that this is a very intense conversation, with the client being furious and the agent being upset. The computing system immediately retrieves and dynamically displays one or more positive snippets that previous clients provided to the agent during interactions with them in the agent's dashboard. By looking at the snippets and prior positive feedback, the agent feels valued and calms down. With an improved mood, the agent is able to respond with empathy and quickly resolve the issue.

Referring now to FIG. 9, suppose a client has a complaint that has not been resolved for several days, so the client calls the contact center and is communicating with the agent. The agent informs the client that the issue will be resolved in two days. The client is dissatisfied and provides negative comments to the agent. The computing system analyzes the interaction between the agent and client, and understands that this is a very intense conversation, with the client being furious and the agent being upset. The computing system immediately retrieves and displays to the agent a similar past conversation in which the agent resolved the issue in a manner positively and favorably to the client. By looking at the past conversation, and the positive feedback received, the agent decides to follow the same approach. The agent calms down and responds with empathy, quickly resolving the issue.

What is claimed is:

1. A method for agent interaction analysis using artificial intelligence, the method comprising:
   receiving, by a computing system, a transcript for a real-time agent interaction between a contact center agent and a contact center client;
   processing, by the computing system, the real-time agent interaction using at least one artificial intelligence model to determine a call adherence score, an agent positivity score, a client sentiment of the contact center client, an agent sentiment of the contact center agent, and a plurality of agent skill levels associated with respective agent skills;
   determining, by the computing system, a combined agent performance score based on the call adherence score and the agent positivity score;
   transmitting, by the computing system, the combined agent performance score to an agent device for display on a gamification dashboard of the contact center agent;
   retrieving, by the computing system, agent-specific content of the contact center agent in response to determining that the agent sentiment of the contact center agent is negative; and
   transmitting, by the computing system, the agent-specific content to the agent device for display in conjunction with the real-time agent interaction to improve the agent sentiment of the contact center agent.

2. The method of claim 1, wherein retrieving the agent-specific content comprises retrieving an agent-specific image associated with a positive experience of the contact center agent; and
   wherein transmitting the agent-specific content to the agent device comprises transmitting the agent-specific image to the agent device for display in conjunction with the real-time agent interaction.

3. The method of claim 1, wherein retrieving the agent-specific content comprises retrieving previous positive client feedback received by the contact center agent; and
   wherein transmitting the agent-specific content to the agent device comprises transmitting the previous positive client feedback to the agent device for display in conjunction with the real-time agent interaction.

4. The method of claim 1, wherein retrieving the agent-specific content comprises retrieving an excerpt from a positive historical interaction with the contact center agent; and
   wherein transmitting the agent-specific content to the agent device comprises transmitting the excerpt from the positive historical interaction to the agent device for display in conjunction with the real-time agent interaction.

5. The method of claim 1, further comprising anonymizing the transcript for the real-time agent interaction to generate an anonymized transcript; and
   wherein processing the real-time agent interaction comprises processing the anonymized transcript.

6. The method of claim 1, further comprising transmitting, by the computing system, a notification to an agent supervisor device in response to determining that the client sentiment of the contact center client is negative.

7. The method of claim 1, wherein the plurality of agent skill levels comprises at least one agent technical skill.

8. The method of claim 1, wherein the plurality of agent skill levels comprises at least one agent soft skill.

9. The method of claim 1, further comprising evaluating, by the computing system, the respective agent skills based on the plurality of agent skill levels and a plurality of respective predefined thresholds.

10. The method of claim 1, further comprising training, by the computing system, the at least one artificial intelligence model based on a plurality of historical interactions between contact center agents and contact center clients.

11. A system for agent interaction analysis using artificial intelligence, the system comprising:
at least one processor; and
at least one memory comprising a plurality of instructions stored thereon that, in response to execution by the at least one processor, causes the system to:
receive a transcript for a real-time agent interaction between a contact center agent and a contact center client;
process the real-time agent interaction using at least one artificial intelligence model to determine a call adherence score, an agent positivity score, a client sentiment of the contact center client, an agent sentiment of the contact center agent, and a plurality of agent skill levels associated with respective agent skills;
determine a combined agent performance score based on the call adherence score and the agent positivity score;
transmit the combined agent performance score to an agent device for display on a gamification dashboard of the contact center agent;
retrieve agent-specific content of the contact center agent in response to a determination that the agent sentiment of the contact center agent is negative; and
transmit the agent-specific content to the agent device for display in conjunction with the real-time agent interaction to improve the agent sentiment of the contact center agent.

12. The system of claim 11, wherein to retrieve the agent-specific content comprises to retrieve an agent-specific image associated with a positive experience of the contact center agent; and
wherein to transmit the agent-specific content to the agent device comprises to transmit the agent-specific image to the agent device for display in conjunction with the real-time agent interaction.

13. The system of claim 11, wherein to retrieve the agent-specific content comprises to retrieve previous positive client feedback received by the contact center agent; and
wherein to transmit the agent-specific content to the agent device comprises to transmit the previous positive client feedback to the agent device for display in conjunction with the real-time agent interaction.

14. The system of claim 11, wherein to retrieve the agent-specific content comprises to retrieve an excerpt from a positive historical interaction with the contact center agent; and
wherein to transmit the agent-specific content to the agent device comprises to transmit the excerpt from the positive historical interaction to the agent device for display in conjunction with the real-time agent interaction.

15. The system of claim 11, wherein the plurality of instructions further causes the system to anonymize the transcript for the real-time agent interaction to generate an anonymized transcript; and
wherein to process the real-time agent interaction comprises to process the anonymized transcript.

16. The system of claim 11, wherein the plurality of instructions further causes the system to transmit a notification to an agent supervisor device in response to a determination that the client sentiment of the contact center client is negative.

17. The system of claim 11, wherein the plurality of agent skill levels comprises at least one agent technical skill.

18. The system of claim 11, wherein the plurality of agent skill levels comprises at least one agent soft skill.

19. The system of claim 11, wherein the plurality of instructions further causes the system to evaluate the respective agent skills based on the plurality of agent skill levels and a plurality of respective predefined thresholds.

20. The system of claim 11, wherein the plurality of instructions further causes the system to train the at least one artificial intelligence model based on a plurality of historical interactions between contact center agents and contact center clients.

* * * * *